United States Patent [19]
Harcourt

[11] Patent Number: 6,102,450
[45] Date of Patent: Aug. 15, 2000

[54] COUPLING HALF AND METHOD OF MAKING SAME

[75] Inventor: Robert Harcourt, Erie, Pa.

[73] Assignee: Snap-Tite Technologies, Inc., Wilmington, Del.

[21] Appl. No.: 09/324,667

[22] Filed: Jun. 3, 1999

[51] Int. Cl.[7] ........................................ F16L 21/00
[52] U.S. Cl. .................. 285/401; 285/405; 285/65; 285/73; 285/423; 264/239; 264/299
[58] Field of Search .................... 285/65, 70–79, 285/405, 401, 423; 264/239, 248, 299

[56] References Cited

U.S. PATENT DOCUMENTS

| | | | |
|---|---|---|---|
| 1,584,278 | 5/1926 | Dessaints | 285/65 |
| 1,738,996 | 12/1929 | Hamilton et al. | 285/73 |
| 3,342,510 | 9/1967 | Walters | 285/65 |
| 3,709,526 | 1/1973 | Cromie | 285/73 |
| 5,333,915 | 8/1994 | Sparling et al. | 285/79 |

*Primary Examiner*—Eric K. Nicholson
*Attorney, Agent, or Firm*—Woodling, Krost and Rust

[57] ABSTRACT

A coupling half for interconnecting fire or other hose to a reciprocal connection mounted on another hose or on a fixed object. The coupling half includes two slots which enable the manufacture of the coupling half quickly, efficiently, and inexpensively. Only two molds are used to cast the coupling half compared with the traditional three molds. The molds are in contact with each other at three radial points with each radial point being separated by the mold cavity. Machining is greatly reduced as the coupling half is made from one piece as compared with the traditional two pieces. Slots in the locking collar enable the coupling half to be made of one piece resulting in less machining and a superior product.

2 Claims, 18 Drawing Sheets

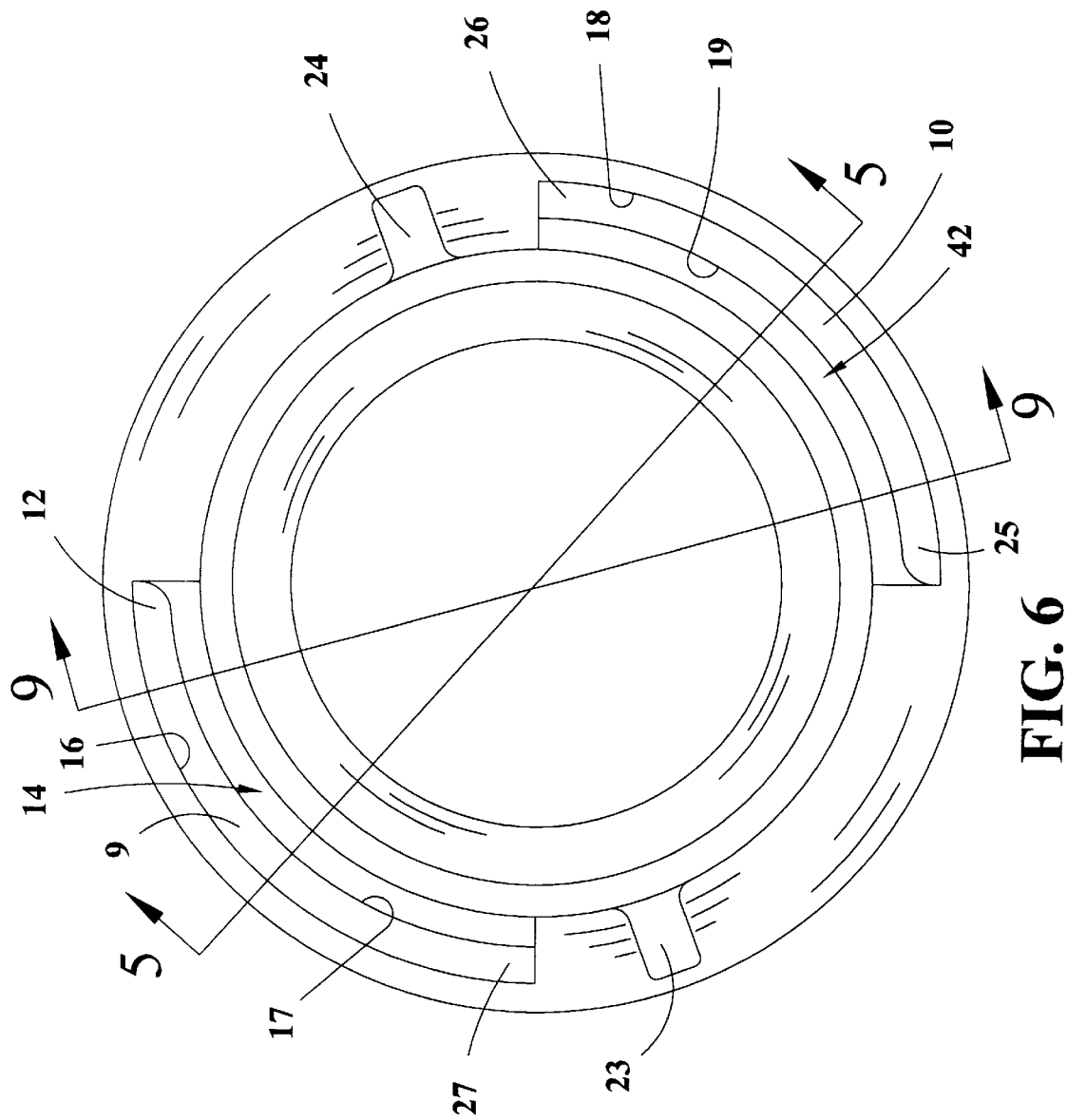

COUPLING HALF AND METHOD OF MAKING SAME

FIELD OF THE INVENTION

This invention relates to coupling halfs which are used to couple two sections or lengths of fire hose together. Sometimes a coupling half is coupled to a coupling half affixed to a stationary object such as a fire plug or a fire truck. Other coupling applications exist for the invention beyond the fire fighting industry.

BACKGROUND OF THE INVENTION

U.S. Pat. No. 489,107 was awarded to Carl August Guido Storz on Jan. 3, 1893 which discloses a sleeve which accepts sealing rings in a recessed groove. A split ring is used to keep the sleeve mounted with respect to the ring (locking collar). The ring includes hooks (connecting lugs) and inclined lips. The Storz '107 patent discloses the use of two coupling halfs together with each coupling half comprising a ring (locking collar) and a sealing ring.

U.S. Pat. No. 5,301,985 to Terzini is a contemporary edition of the Storz coupling disclosing and claiming a pivot pin which is mounted through a lug. U.S. Pat. No. 4,524,997 to Ebert discloses a rotatable cam ring which rotates relative to a hose connection piece. The hose connection piece includes a sealing ring secured by a holding ring.

Storz was the pioneer in this technology and the evolution of the technology is evidenced by the patents to Terzini and to Ebert. FIGS. 1, 2, 2A, 2B, 3 and 4 disclosed herein represent another evolution of the technology which is known to those skilled in the art. These figures depict a locking collar 1 (sometimes referred to as a Storz collar) in combination with a seal ring 2. Two pieces are necessary because of the manufacturing process used to make the coupling halfs.

The prior art locking collar 1 and seal ring 2 are separately cast, machined and threaded. The prior art employs three molds as illustrated in FIG. 12 to cast the Storz collar. The molds for the seal ring 2 are not shown but yield a part having a cross-sectional shape as indicated in FIG. 2C. The seal ring is threaded to the Storz collar and adhesive is applied to the threaded interconnection to permanently secure the seal ring to the Storz collar and to prevent leaks from the hose.

It is the lip which is sometimes referred to as the ramp (reference numerals 9, 10, 11 and 12 of FIG. 2) which necessitates that the mold from which the Storz collar is made comprises three parts. But for the lip, ramp and stop, the seal ring and the prior art Storz collar could be made as one piece from a two part mold. The lip, ramp and stop coact with the connecting lugs of another coupling half to lock the two coupling halfs together as is well known in the art. The prior art Storz collar necessitates that it be made from a three part mold and that a companion seal ring be separately molded.

SUMMARY OF THE INVENTION

The invention solves the problem just explained through the addition of slots in a shoulder of the Storz collar above the ramps, lip and stop. Inclusion of the slots in the Storz collar enables the Storz collar and the seal ring to be made as one part instead of two parts eliminating the threaded interconnection therebetween and considerable machining. Additionally, inclusion of the slots allows the single part Storz collar-seal ring to be cast using only a two part mold.

The result of the invention is a coupling half whose performance exceeds that of the prior art, is lighter in weight than the prior art, and can be manufactured more quickly and inexpensively than the prior art.

It is an object of the present invention to provide a Storz collar-seal ring made in one piece.

It is a further object of the present invention to provide a Storz collar-seal ring made in one piece from two mold parts.

It is a further object of the present invention to provide a Storz collar-seal ring made in one piece having slots therein.

It is a further object of the present invention to provide a one piece Storz collar-seal ring which requires minimal machining.

It is a further object of the present invention to provide a one piece Storz collar-seal ring made from two molds which contact each other in three places radially spaced apart by a mold cavity.

Other objects and an understanding of the invention may be had by referring to the Brief Description of the Drawings, the Description of the Invention and the Claims which follow below.

BRIEF DESCRIPTION OF THE DRAWINGS

FIG. 6 is a top view of the coupling half of the invention illustrating the slots, ramps and stops.

DESCRIPTION OF THE INVENTION

Figure 1:
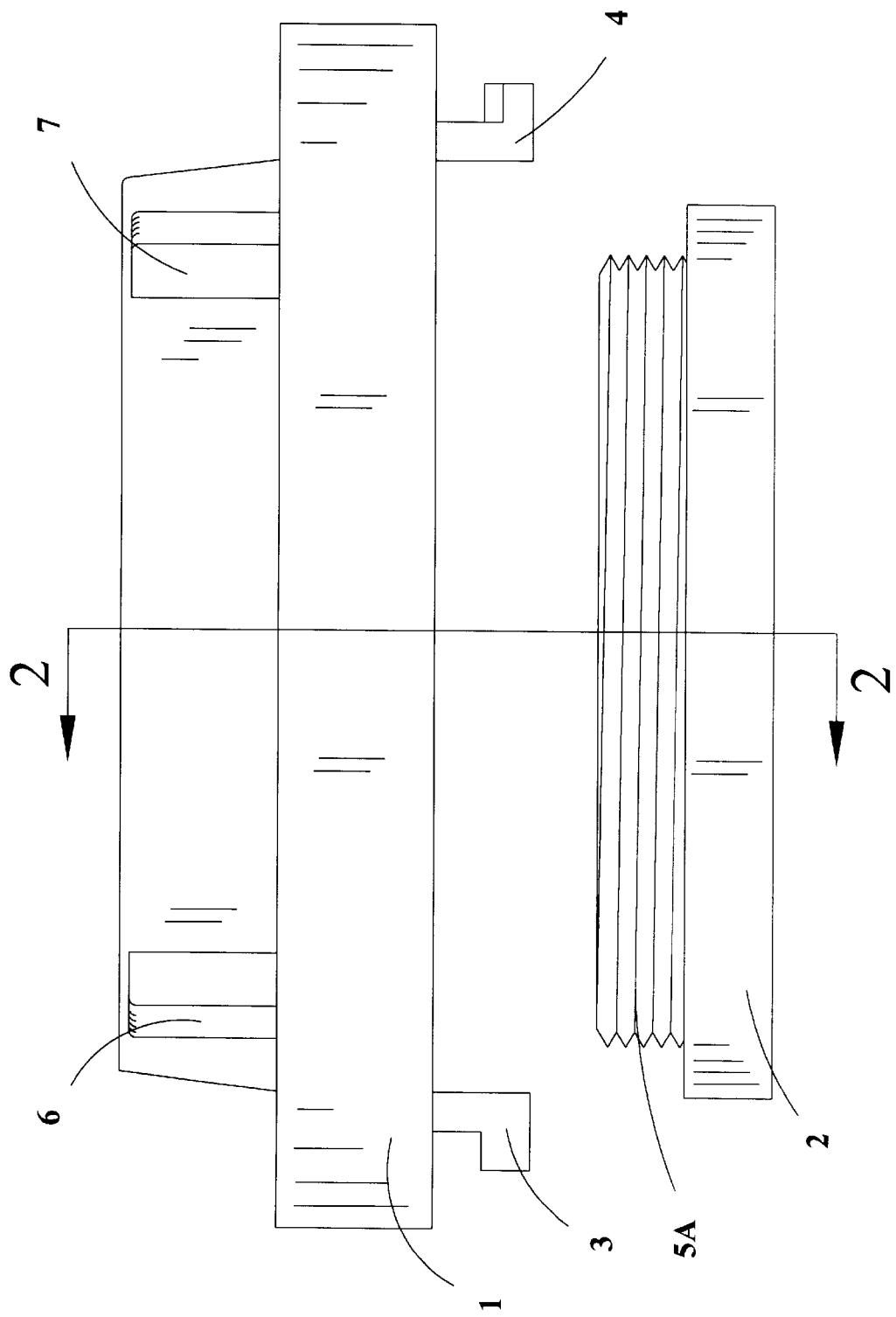
FIG. 1 is a front plan view of a prior art coupling half comprising a locking collar and seal ring.

FIG. 1 is a prior art Storz collar 1 and seal ring 2. The Storz collar 1 includes connecting lugs 3 and 4. Wrenching lugs 6 and 7 are also shown. Threads 5A are also illustrated on the seal ring.

Figure 2:
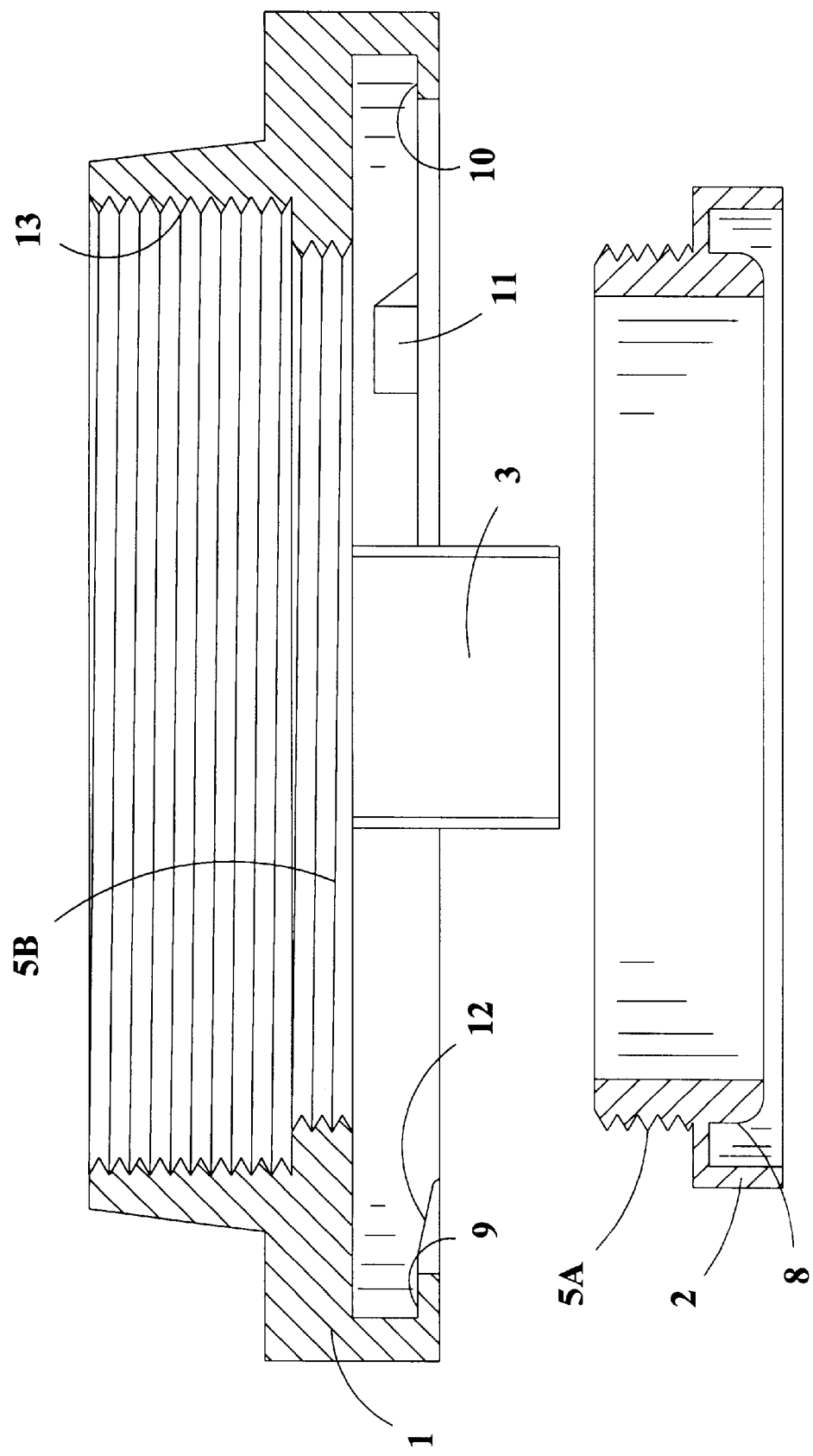
FIG. 2 is a cross-sectional view of the prior art coupling half of FIG. 1 taken along line 2—2 of FIG. 1.

Referring to FIG. 2 threads 5A of the seal ring mate with threads 5B of the Storz collar 1. FIG. 2 illustrates the prior art Storz collar 1 and seal ring 2 along line 2—2 of FIG. 1. Storz collar 1 includes a first cam surface 9 and a second cam surface 10. A ramp 12 on the cam surface 9 is also illustrated as is a stop 11 on the cam surface 10. The cam surfaces 9 and 10 are generally circularly shaped and include a ramp portion and a stop portion. FIG. 2 also illustrates seal recess 8 in the seal ring 2.

Figure 2A:
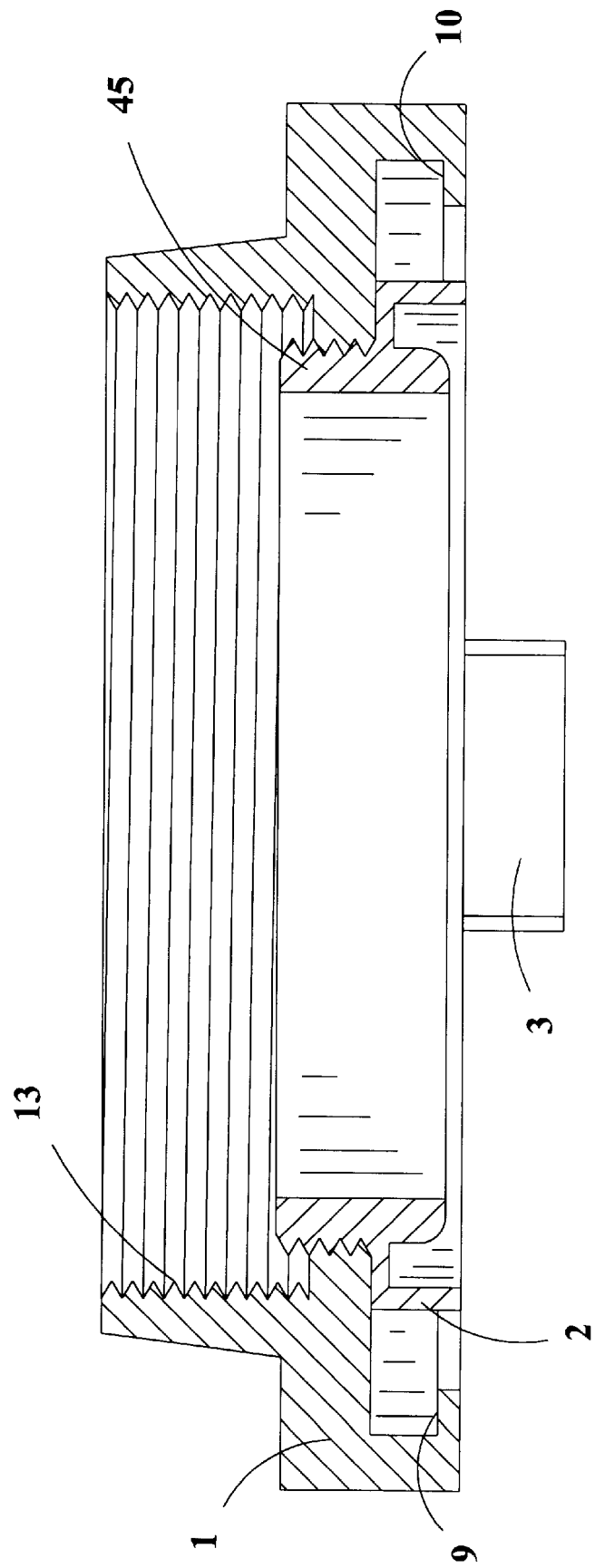
FIG. 2A is a cross-sectional view of the prior art coupling half of FIG. 2 illustrating the seal ring threaded into the locking collar.
Figure 2B:
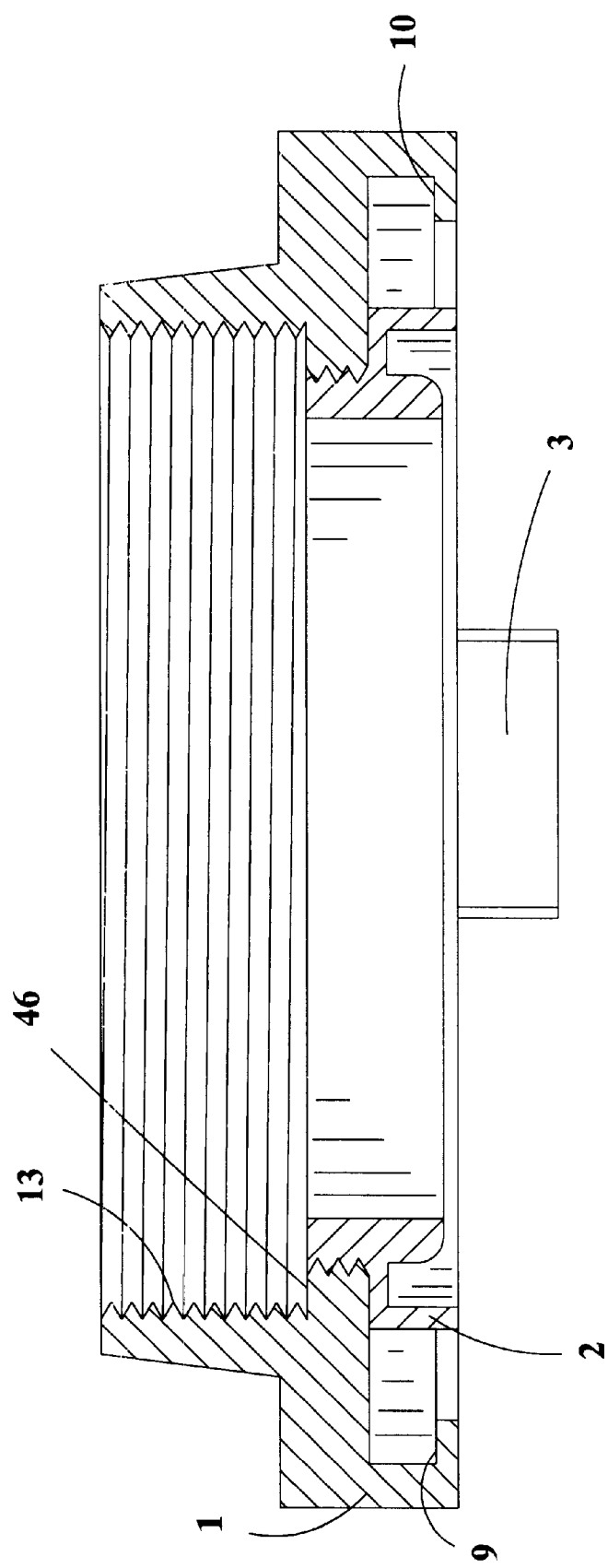
FIG. 2B is a cross-sectional view similar to the view as illustrated in FIG. 2A with additional machining performed on the seal ring to form a seal recess.
Figure 2C:
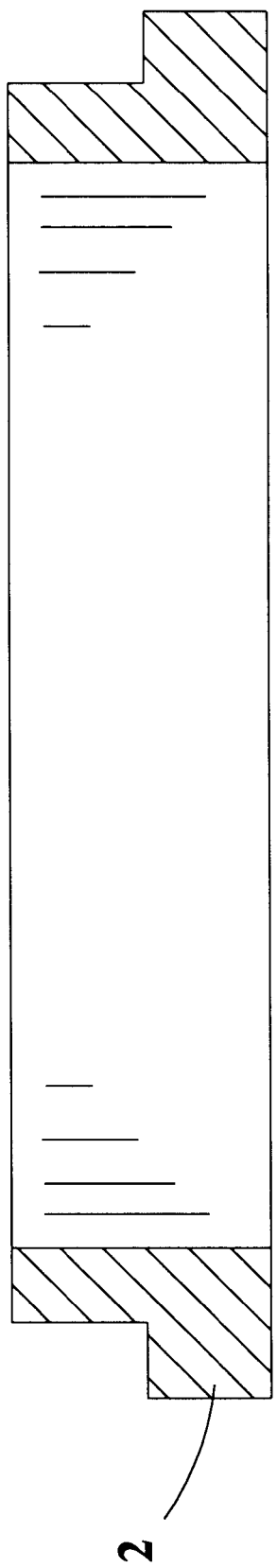
FIG. 2C is a cross-sectional view of the seal ring prior to the machining of the groove.

FIG. 2A illustrates the Storz collar and the seal ring 2 of the prior art interconnected together. Reference numeral 45 in FIG. 2A indicates the location of excess portion of the seal ring which must be machined prior to having a completed coupling half. In other words seal ring 2 must be flush with the bottom of Storz collar 46 as shown in FIG. 2B. FIG. 2C is a cross-sectional view of the seal ring prior to the machining of the seal recess 8. See FIG. 2.

Figure 3:
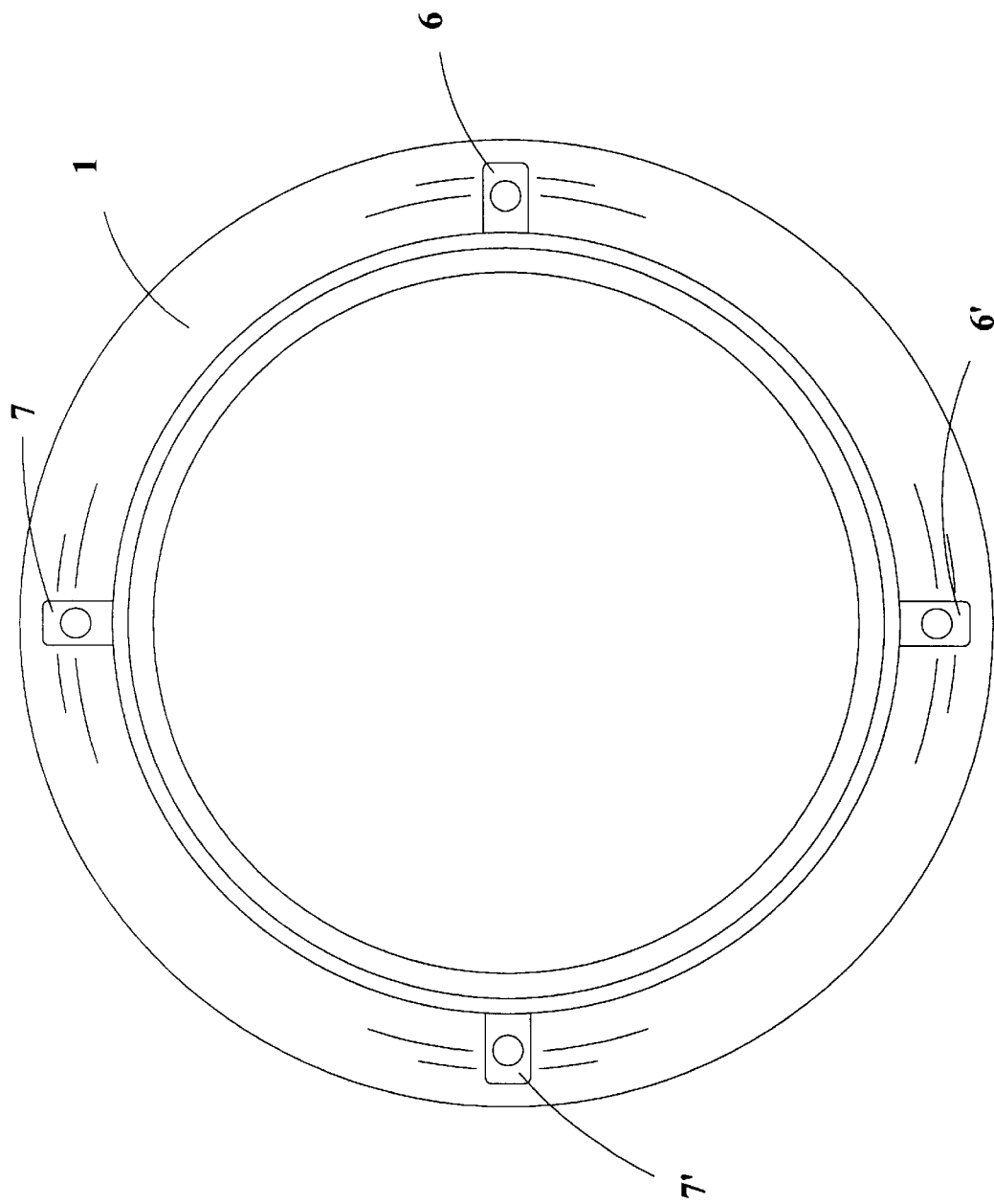
FIG. 3 is a top view of the prior art locking collar.

FIG. 3 is a top view of the prior art Storz collar sometimes referred to herein as a locking collar. FIG. 3 illustrates wrenching lugs 6, 6', 7 and 7'.

Figure 4:
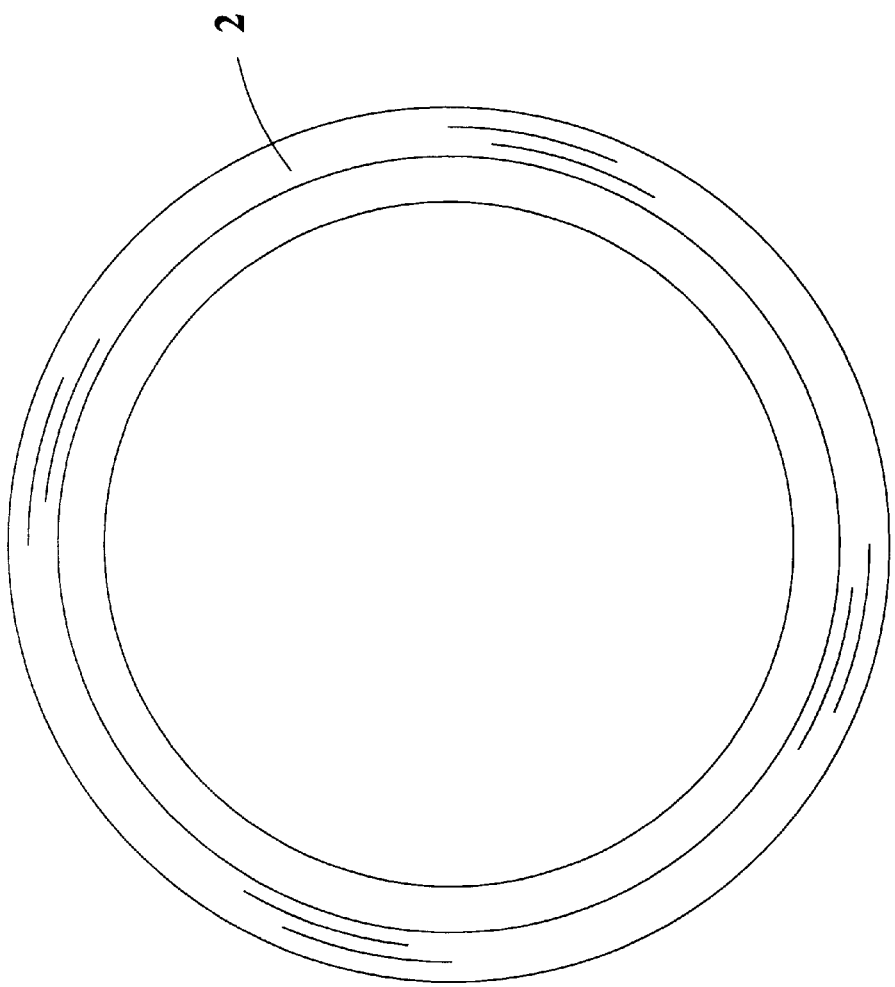
FIG. 4 is a top view of the prior art seal ring.

FIG. 4 is a top view of the prior art sealing ring 2.

Figure 5:
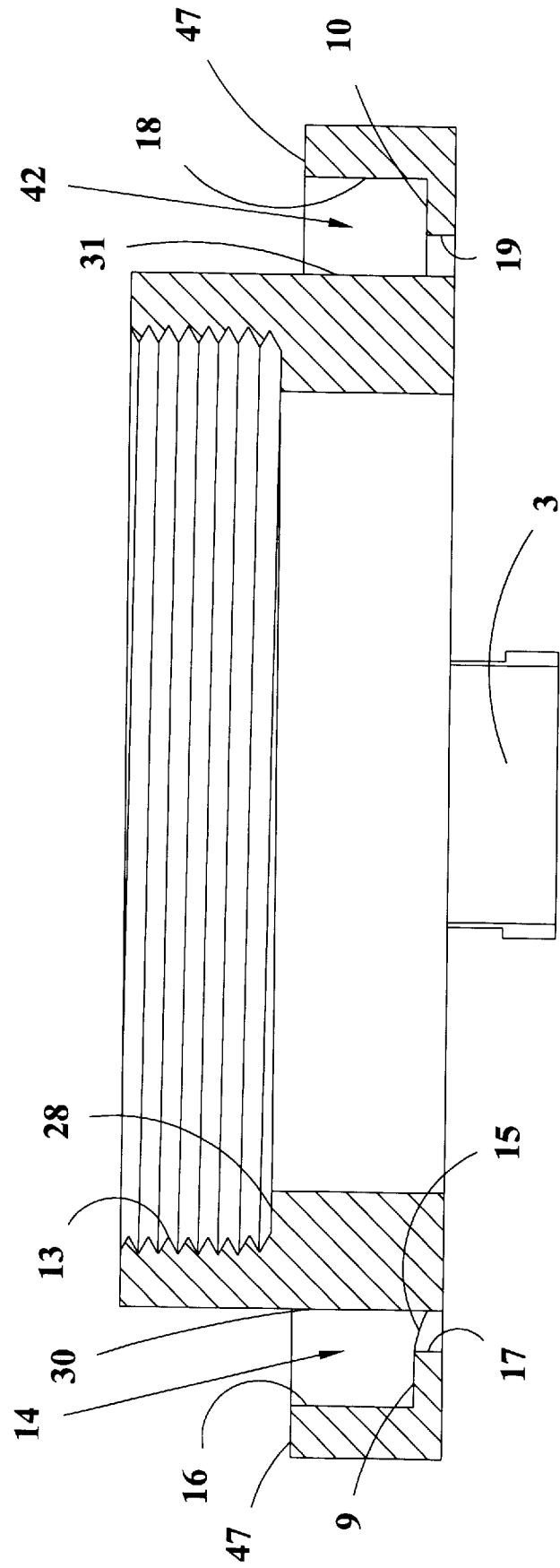
FIG. 5 is a cross-sectional view of the instant invention taken along line 5—5 of FIG. 6.

FIG. 5 is a cross-sectional view of the instant invention taken along line 5—5 of FIG. 6. FIG. 5 illustrates the first slot 14 and the second slot 42. The slots are arcuate and extend through circumferential shoulder 47. First slot 14 includes a first wall 16, a second wall 17, and a slot wall 30. Second slot 42 includes a first wall 18, a second wall 19, and a slot wall 31. These slots are an important aspect of the present invention, as will be described further hereinbelow. FIG. 5 illustrates the one piece Storz collar-seal ring with threads 13 machined into the Storz collar. Reference numeral 28 indicates a flush surface which is formed into the Storz collar-seal ring during the molding process. No separate machining process is necessary to trim the seal ring as was required in connection with the prior art. For example see FIGS. 2A and 2B which illustrate that the seal ring 2 was machined to provide a flush surface such as the one represented by reference numeral 28 in FIG. 5.

Figure 5A:
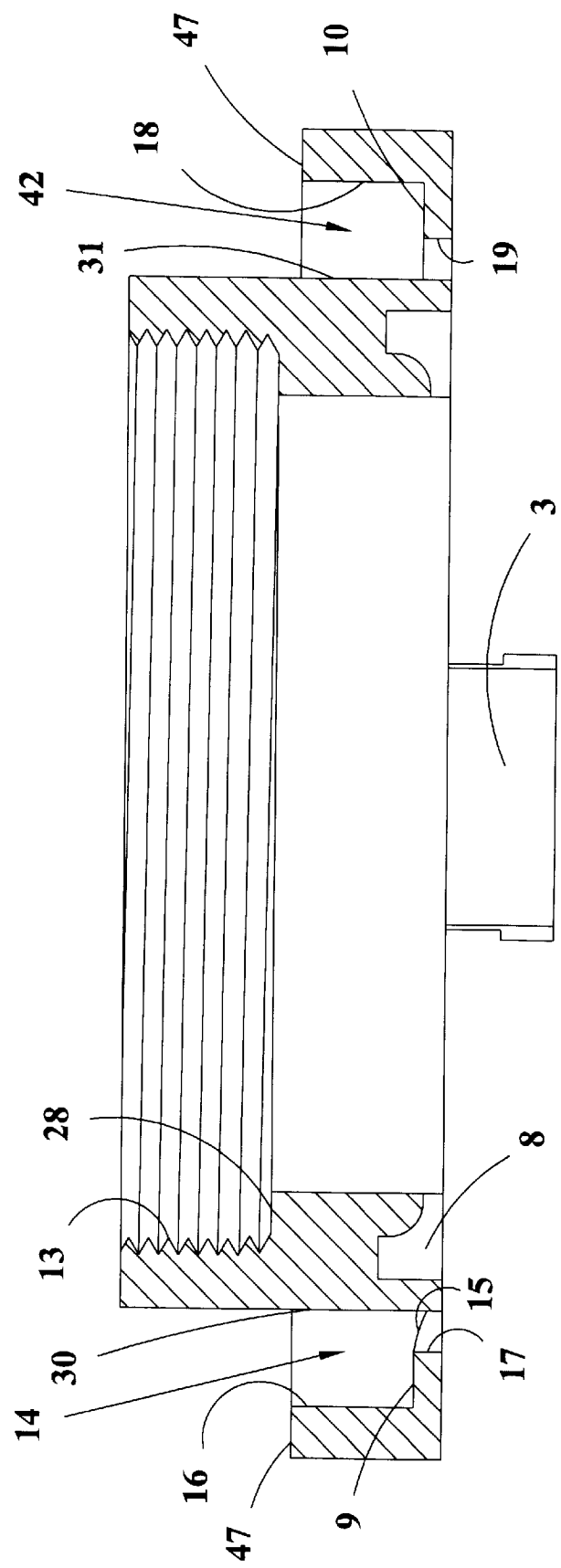
FIG. 5A is a cross-sectional view of the instant invention similar to that shown in FIG. 5 with a seal recess machined in the coupling half.

FIG. 5A is a cross-sectional view of the instant invention similar to that shown in FIG. 5 with the seal recess 8 machined into the coupling half, otherwise known as the Storz collar-seal ring.

FIG. 6 is a top view of the coupling half of the invention illustrating the slots 14 and 42, ramps 12 and 25, and stops 27 and 26 on cam surfaces 9 and 10, respectively. The stops 27 and 26 are raised portions such that when the connecting lugs 3 and 4 of another coupling half engage the cam surfaces 9 and 10. When the coupling halves are rotated each with respect to the other, the connecting lugs abut stops 27 and 26 preventing further rotation of the coupling halves with respect to each other. The coupling action of the halves is known in the art. Referring still to FIG. 6, wrenching lugs 23 and 24 are shown which perform the identical function of the wrenching lugs of the prior art.

Figure 7:
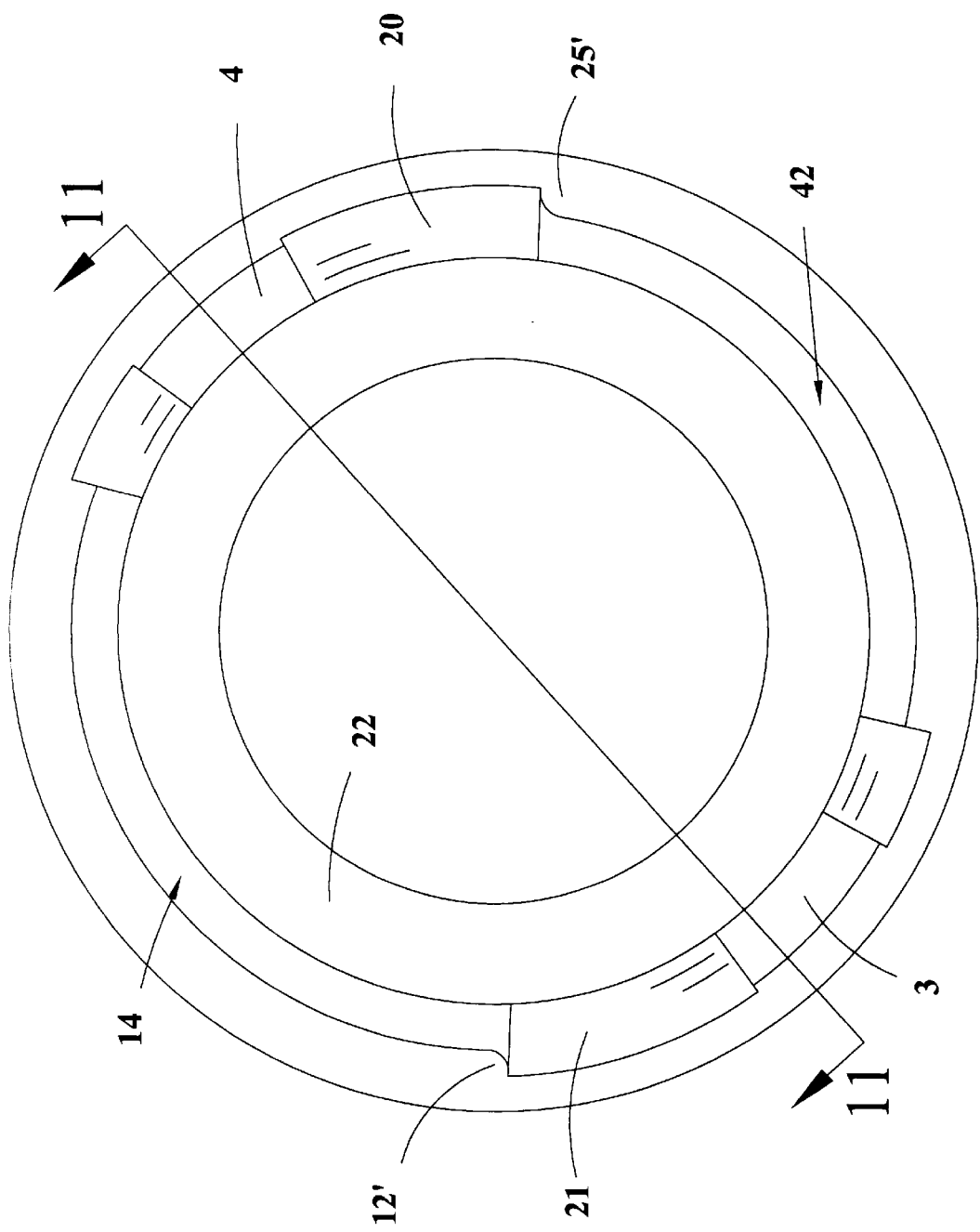
FIG. 7 is a bottom view of the coupling half of the invention illustrating among other things the slots.

FIG. 7 is a bottom view of the coupling half of the invention illustrating the slots 14 and 42. Underside 12' of ramp 12 and underside 25' of ramp 25 are shown. The purpose of illustrating the undersides of the ramps is just to provide a reference point for viewing FIG. 7. Access spaces 20, 21 provide room to interconnect connecting lugs which are sometimes referred to as connecting cam locks 3, 4. Reference numeral 22 indicates an integral seal ring. It will be noticed when referring to FIG. 7 that connecting lugs or cam locks 3, 4 are also shown here. It will be understood by those skilled in the art that only one coupling half is shown in the drawing figures and that this coupling half mate with either an identical coupling half or an adapted version of this coupling half mounted to a fire truck, a fire hydrant, or another hose length or section.

Figure 7A:
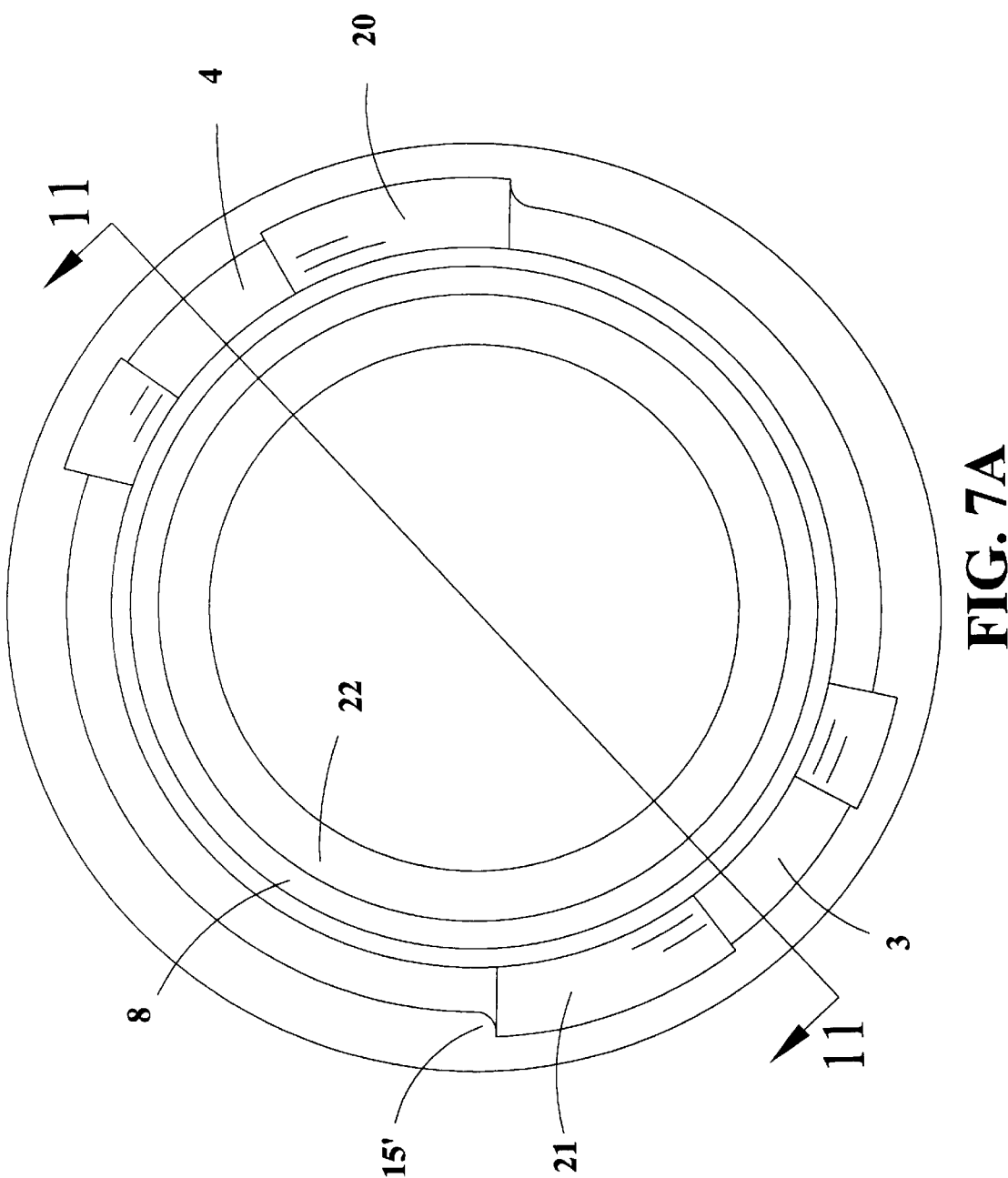
FIG. 7A is a bottom view of the coupling half of the invention illustrating a machined seal recess.

FIG. 7A is a bottom view of the coupling half of the invention illustrating a machined seal recess 8 in the integral seal ring 22. The integral seal ring 22 is somewhat of a misnomer because this invention permits the Storz collar-seal ring to be made of one part or piece as compared to two parts (one of which is the seal ring) which require machining as is known in the prior art.

Figure 8:
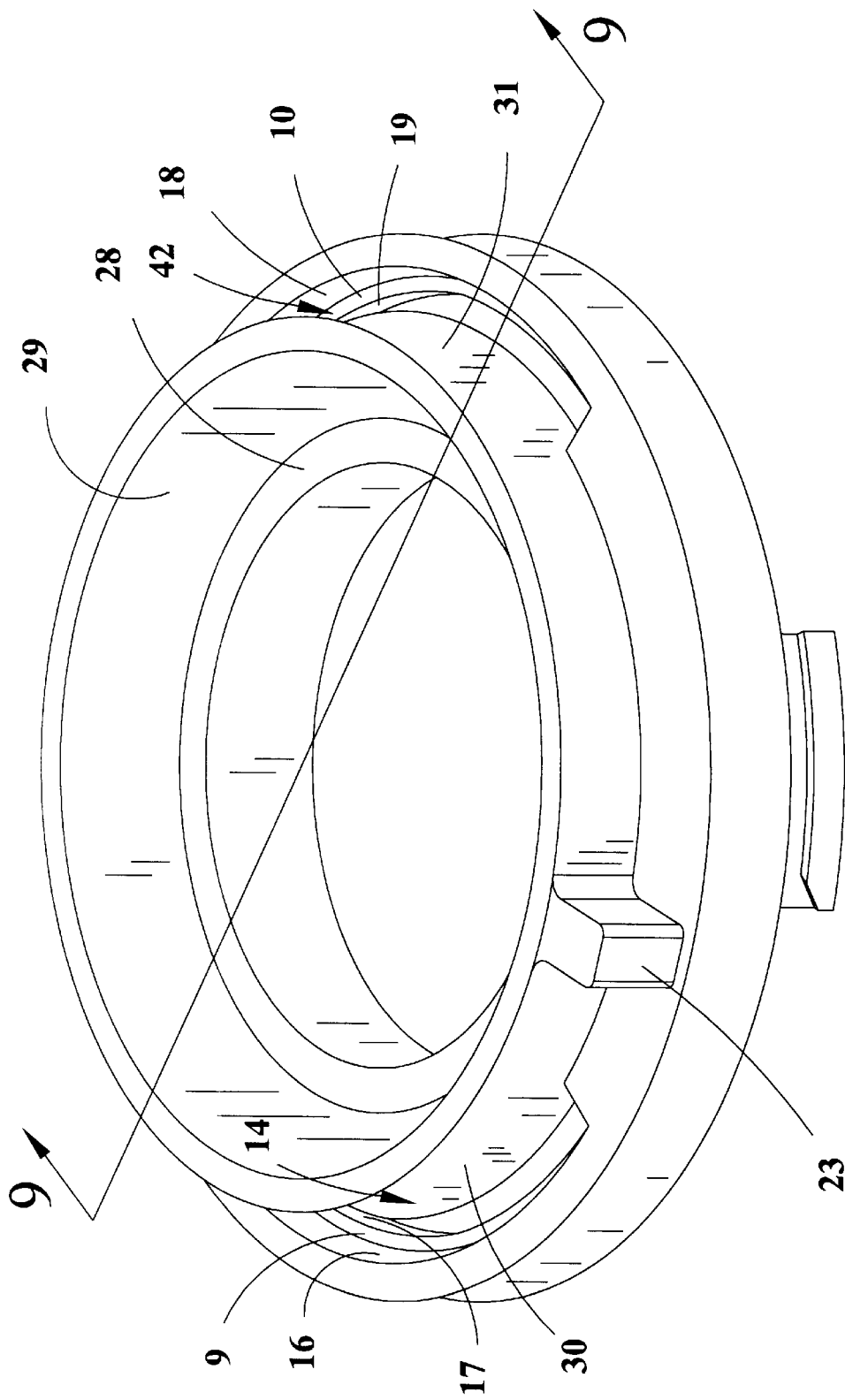
FIG. 8 is a perspective view of the instant invention.

FIG. 8 is a perspective view of the instant invention. Most notably, slots 14 and 42 are illustrated. Reference numeral 29 indicates that threads are to be machined on the inner surface of the Storz collar.

Figure 9:
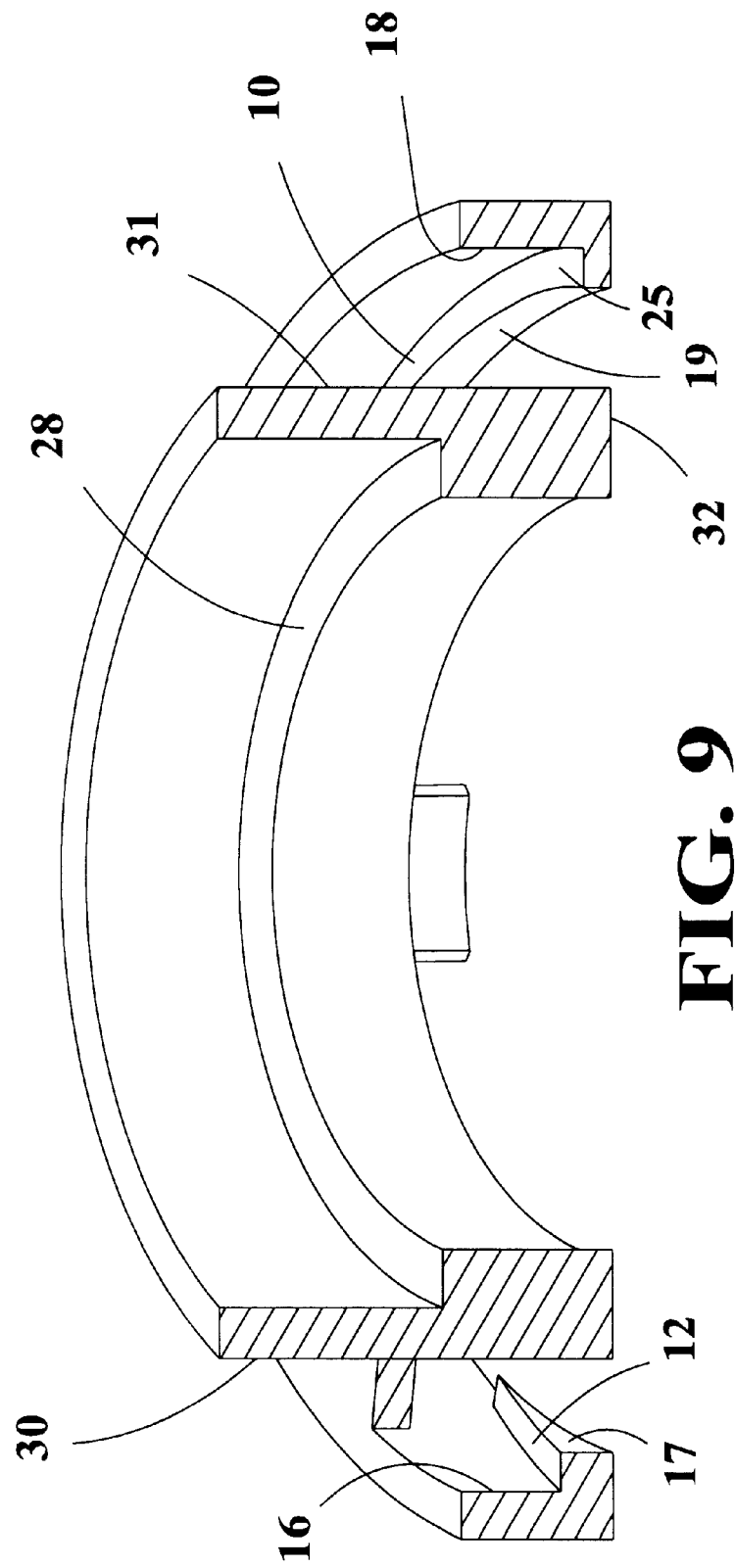
FIG. 9 is a cross-sectional view of the instant invention taken along line 9—9 of FIG. 8. Line 9—9 is also set forth in FIG. 6.

FIG. 9 is a cross-sectional view of the invention taken along the line 9—9 of FIG. 8. Line 9—9 is also set forth in FIG. 6. FIG. 9 illustrates ramp 12 as part of and leading to cam surface 9 and ramp 25 as part of and leading to cam surface 10. It will be noted that in FIG. 9 the seal recess 8 has not yet been machined into the coupling half. Reference numeral 32 indicates the portion of the Storz collar-seal ring where the seal recess will be machined.

Figure 10:
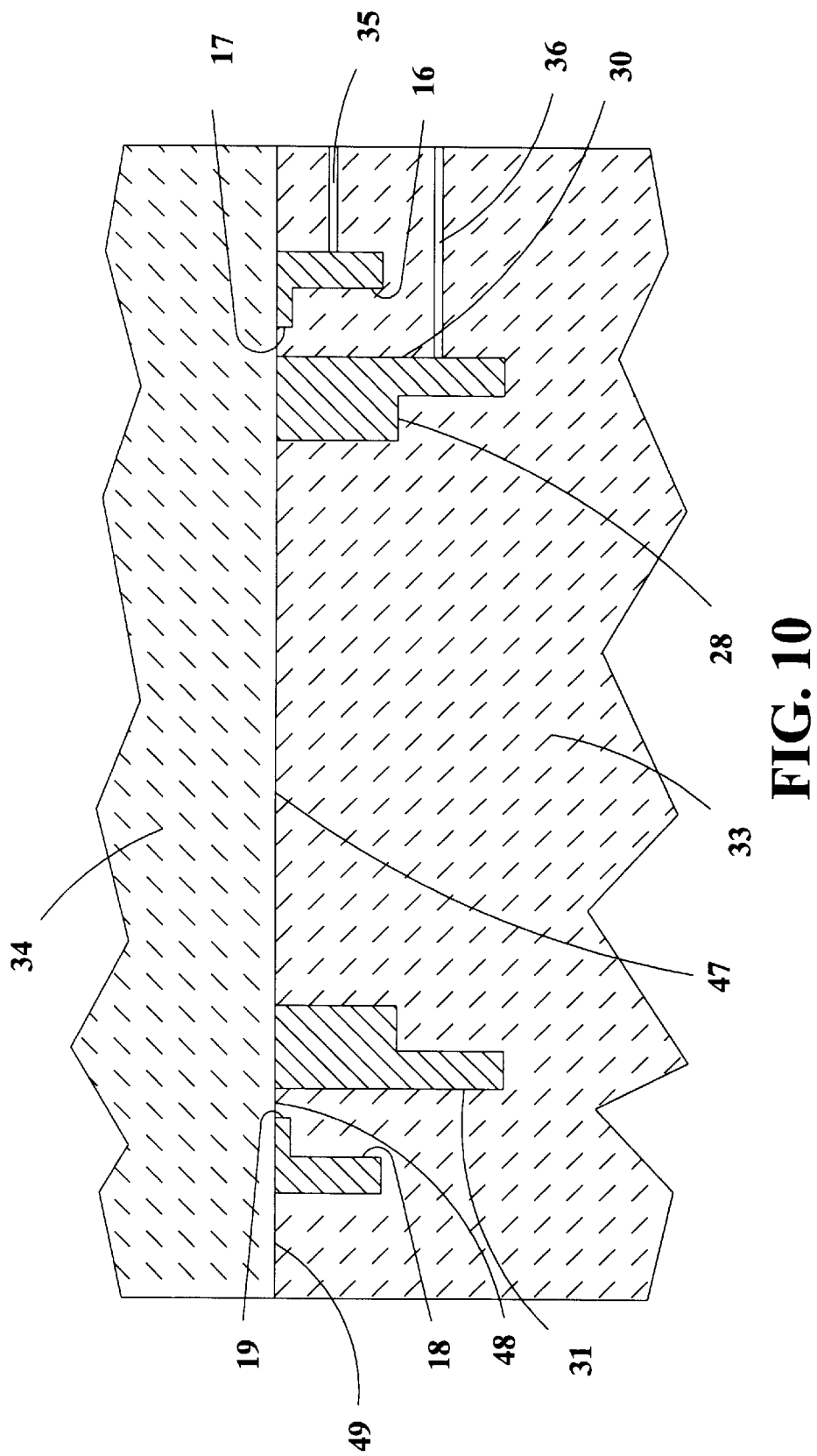
FIG. 10 is a cross-sectional view of the first and second mold and the cavity of the instant invention wherein it is illustrated that the first mold engages the second mold in three places separated by the cavity.

FIG. 10 is a cross-sectional view of the first mold 33 and the second mold 34 in the cavity of the instant invention. It will be noted that the first mold 33 engages the second mold 34 in three places as indicated generally by reference numerals 47, 48, and 49. These places of engagement 47, 48, and 49 are separated by mold cavities. These mold cavities are illustrated in FIG. 10 as having already received molten material such as aluminum.

The mold cavities are defined using the same reference numerals used in FIG. 5. Typically the Storz collar-seal ring will be made from either aluminum or brass. Aluminum or brass are used in the prior art Storz collar and seal ring assemblies. Fill ports 35 and 36 are indicated and these fill ports are used to supply molten aluminum or molten brass to the mold. FIG. 10 is a cross-sectional view taken through the mold at a place where the slot 14 and 42 are formed.

Figure 11:
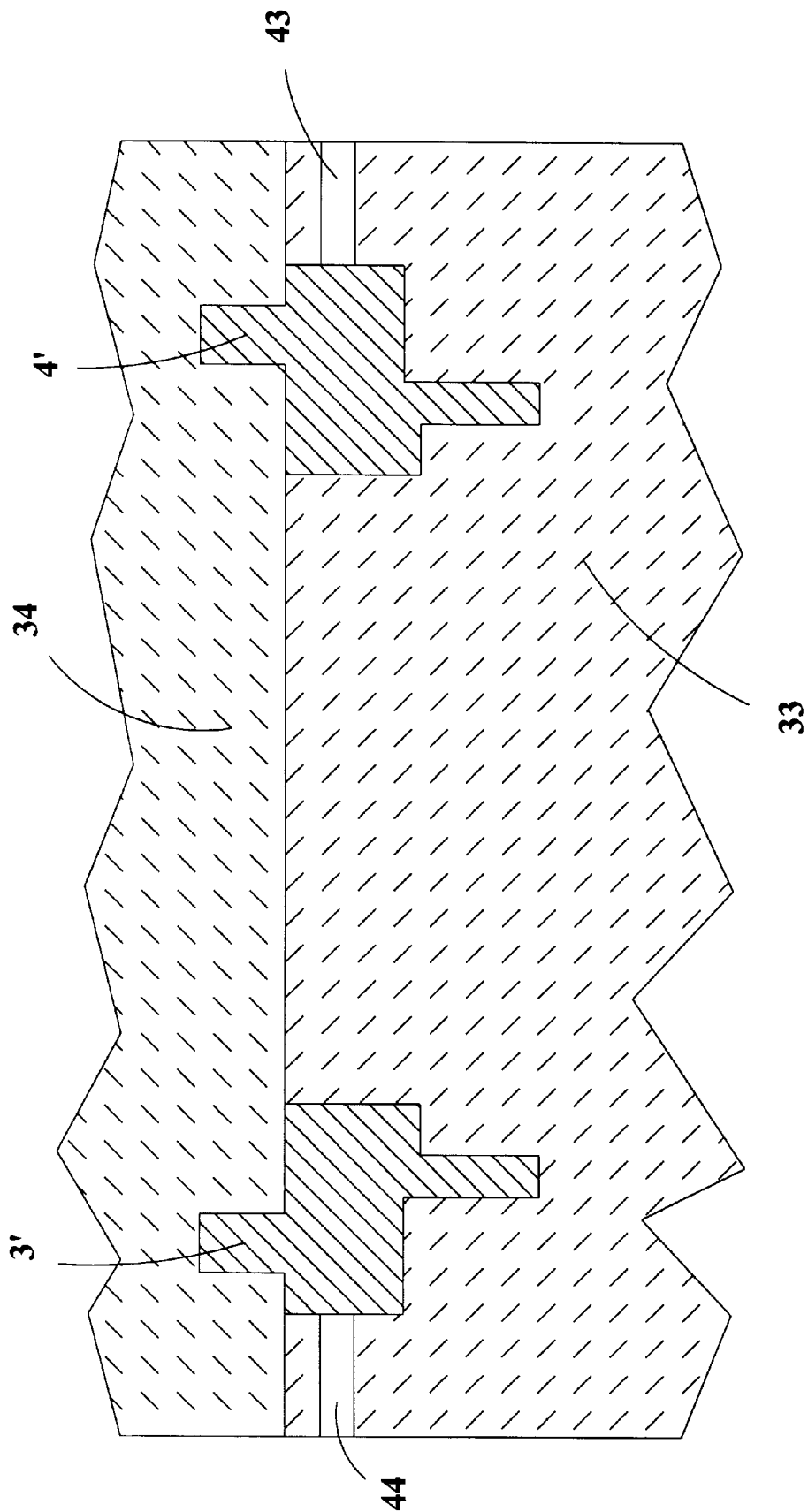
FIG. 11 is a cross-sectional view of the first and second mold and the cavity of the instant invention illustrating the portion of the cavity which forms the connecting lugs.

FIG. 11 is a cross-sectional view of the first mold 33 and the second mold 34 and the cavity illustrating the portion of the cavity which forms the connecting lugs. Reference numerals 3' and 4' illustrate the connecting lugs prior to machining. Reference numerals 43 and 44 are used to denote additional fill ports which are used to fill the cavity.

Figure 12:
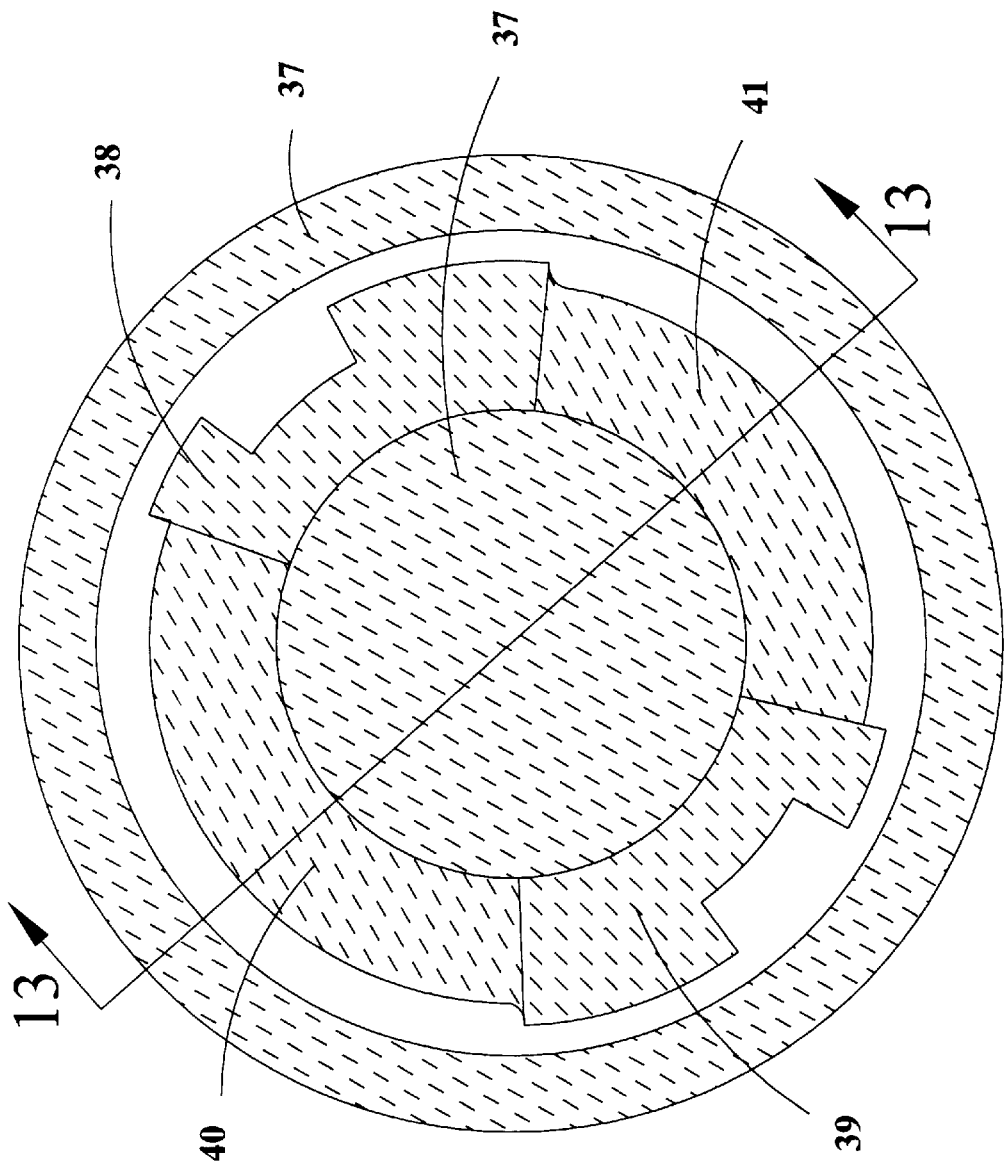
FIG. 12 is a cross-sectional view of the prior art three piece locking collar mold taken along line 12—12 of FIG. 13.
Figure 13:
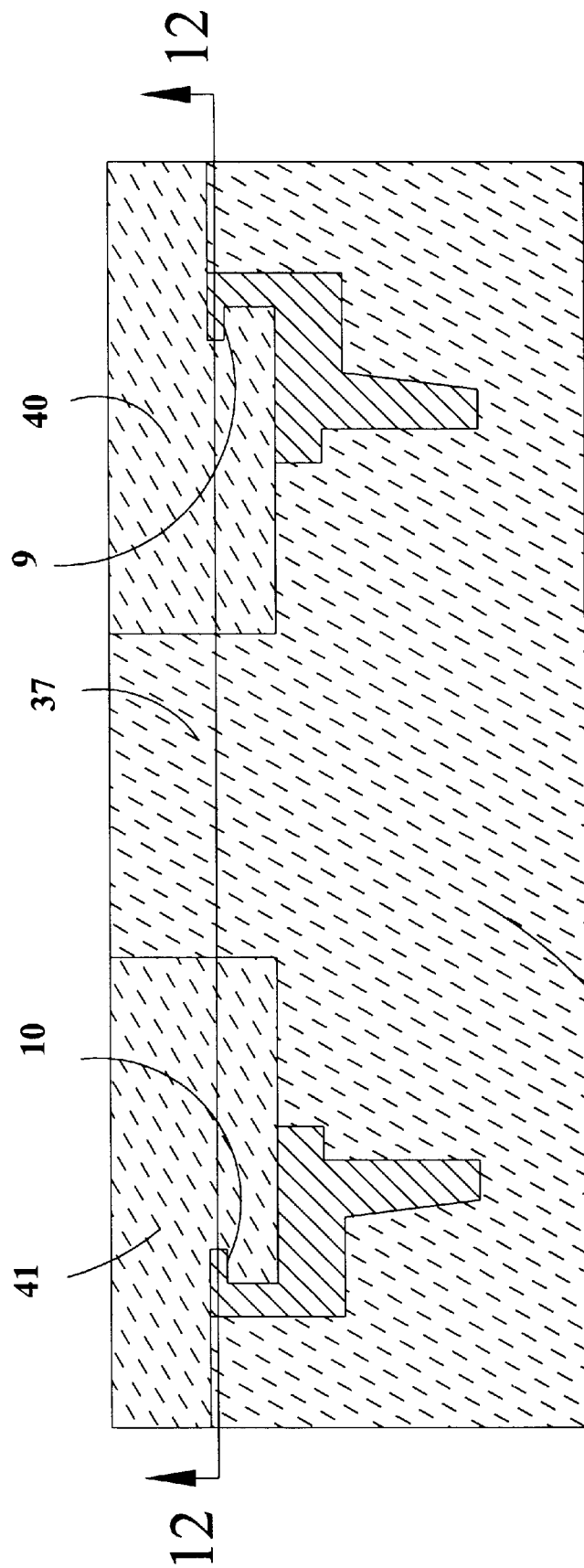
FIG. 13 is a vertical cross-sectional view of the prior art three piece locking collar mold taken along line 13—13 of FIG. 12.

FIG. 12 is a cross-sectional view of the prior art three piece locking collar mold taken along line 12—12 of FIG. 13. FIG. 12 illustrates a first bottom mold 37, a first core 38, a second core 39, a third core 40, and a fourth core 41. After the molding process is completed the first core 38 and the second core 39 are pulled upwardly around the spaces in which the connecting lugs or cam locks 3 and 4 are formed. The first bottom mold 37 is pulled downwardly and the third core 40 and fourth core 41 collapse inwardly so that they may be pulled out from underneath the ramps, cam surfaces and stops.

FIG. 13 is a cross-sectional view taken along the line 13—13 of FIG. 12. FIG. 13 illustrates a cross-sectional view of the Storz collar along the line which does not illustrate the connecting lugs or cam locks 3 and 4.

The foregoing invention has been described by way of example only. Those skilled in the art will readily recognize that several changes and modifications may be made to the foregoing invention without departing from the scope and the spirit of the appended claims. For instance, a different slot configuration is contemplated. Many different slot configurations which will permit the formation of ramps, cam surfaces and stops of different configurations are envisioned.

I claim:

1. A coupling half comprising:

a one-piece locking collar;

said locking collar includes a generally cylindrical shoulder;

said shoulder of said locking collar includes a first slot and a second slot therethrough;

said shoulder of said locking collar further includes a first ramp and a first stop;

said first ramp terminating at said first stop;

said shoulder of said locking collar further includes a second ramp and a second stop;

said second ramp terminating at said second stop;

a pair of connecting lugs; and, a recess in said locking collar for receiving a seal.

2. A process for making a coupling half having a locking collar, said locking collar having a shoulder, said shoulder having a first slot and a second slot therethrough, said shoulder of said locking collar further includes a first ramp terminating at a first stop and a second ramp terminating at a second stop, and, said locking collar further including a recess in said locking collar, said process comprising the steps of:

securing a first mold and second mold together, said first and second molds being in contact with each other at three radial points with each radial point being separated radially by a cavity in said first mold;

casting molten metal into said cavity;

allowing said cast molten metal sufficient time to cool and harden into a casting;

separating said first and second molds from each other and from said hardened metal; and, machining a recess into said casting.

\* \* \* \* \*